United States Patent [19]

McNamara

[11] 3,904,861

[45] Sept. 9, 1975

[54] PRINTED CIRCUIT BOARD TESTING UNIT

[75] Inventor: John E. McNamara, Acton, Mass.

[73] Assignee: Digital Equipment Corporation, Maynard, Mass.

[22] Filed: Mar. 13, 1974

[21] Appl. No.: 450,585

[52] U.S. Cl.. 235/153 AC; 324/158 F; 340/146.1 E

[51] Int. Cl.²..................... H04M 3/26; G08C 25/02

[58] Field of Search ....... 235/153 AC; 340/146.1 E; 324/73 R, 73 PC, 158 F

[56] References Cited

UNITED STATES PATENTS

| | | | |
|---|---|---|---|
| 2,952,810 | 9/1960 | Helton | 324/158 F |
| 3,147,054 | 9/1964 | Alexander et al. | 324/158 F |
| 3,622,877 | 11/1971 | MacDavid et al. | 340/146.1 E |
| 3,633,016 | 1/1972 | Walker et al. | 235/153 AC |
| 3,755,888 | 9/1973 | Beil | 324/73 PC |
| 3,787,810 | 1/1974 | Wiggins et al. | 340/146.1 E |
| 3,789,205 | 1/1974 | James | 235/153 AC |
| 3,808,532 | 4/1974 | Yuska | 324/158 F |

*Primary Examiner*—Charles E. Atkinson
*Attorney, Agent, or Firm*—Cesari and McKenna

[57] ABSTRACT

A unit for insertion in circuit with a circuit board for testing or other purposes. The unit includes an extender board containing circuits for transmitting and receiving data. The circuit board is removed and the extender board is placed in circuit with the circuit board. The circuit board may then be tested with a duplication of system conditions, the circuits in the extender board receiving and transmitting data.

4 Claims, 5 Drawing Figures

PRINTED CIRCUIT BOARD TESTING UNIT

BACKGROUND OF THE INVENTION

This invention generally relates to the field of data communications and specifically to the field of digital data communications between remote locations.

Data processing systems normally transfer data with two general types of devices: local and remote devices. Local devices, such as memory devices and other system components in the same area as the central processor unit, may be connected for parallel data transfers. Data transfers with remote devices, however, are made serially, not in parallel, over communications circuits through signal conditioning units ranging from signal level converters to "modems." As known, logic values in different devices are often represented by signals of different voltages. Signal level converters receive logic signals from one device represented by one set of voltages and produce another set of representative voltages which are compatible with the characteristic signals of another device. These devices may be unidirection or bidirectional.

A "modem" modulates and demodulates the data into or from the form the signals take on the communications circuit. A modem at a transmitting location includes a modulator to transmit a modulated signal which is compatible with a particular communications circuit, such as a telephone line or microwave circuit, for transmission to a remote location. A modem at the receiving location demodulates this information, and thereby returns it to a form that is compatible with the remote device. Each modem can both receive and transmit data. Communications systems may also transfer digital data betweeen devices other than those associated with data processing systems. These devices include teletypewriter systems and facsimile transmission systems.

These signal conditioning units are essential elements in these data communication systems. A failure can interrupt communications between the two locations. Thus, it is important to be able to diagnose system failures quickly and accurately. Normally, a repairman proceeds to a site with diagnostic equipment which contains various circuits for energizing and testing the signal conditioning unit. He tests the unit by disconnecting it from the communications circuits and connecting it to the diagnostic equipment for testing.

This diagnostic equipment, however, has some disadvantages. First, the signal conditioning unit must be disconnected from the system. Thus, the diagnosis does not duplicate system conditions, which can make diagnosis difficult. For example, it is difficult to diagnose a problem when the unit is operating properly, but signal levels generated by other system circuits are responsible. Secondly, this equipment adds to expense because it must duplicate many of the circuits which are already present in the operating system including the power supply circuits.

Therefore, it is an object of this invention, to provide a testing circuit for testing signal conditioning units in situ.

Another object of this invention is to provide an in situ testing circuit which is less expensive than independently operable self-contained testing instruments.

SUMMARY

In accordance with this invention, a diagnostic testing or modification circuit mounts on an extender board into which a signal conditioning unit is plugged. The extender board has a number of pin locations which correspond to the locations at the unit connection. All pins which are active in the unit pass directly across the extender board to the unit except for data connections. Data from a communications link passes to a receiving connection which terminates in a testing circuit. Other circuits independently transmit data sequences onto the communications link.

In use, the extender board is plugged into a connector which normally holds the unit. The circuit on the extender board can then tap power from the conductors which supply power to the units so no separate power supplies are required.

This invention is pointed out with particularity in the appended claims. A more thorough understanding of the above and further objects and advantages of this invention may be attained by referring to the following description taken in conjunction with the accompanying drawings.

DESCRIPTION OF AN ILLUSTRATIVE EMBODIMENT

Figure 1:
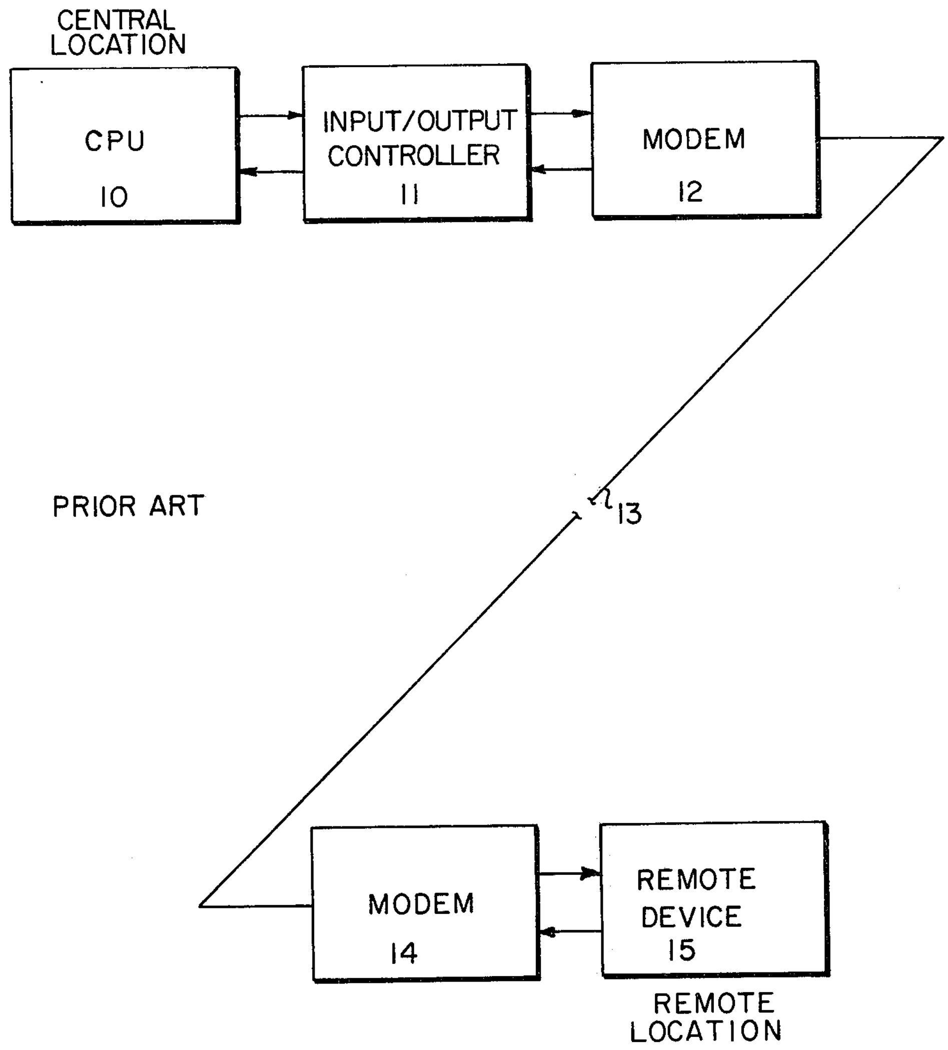
FIG. 1 depicts a prior art data communications system for transferring data between central and remote locations.

FIG. 1 shows a central processor unit (CPU) 10 for transmitting or receiving data signals and processing data. Equivalent data transmitters or receivers may replace the CPU 10, such as facsimile transmitters and receivers. The CPU 10 may communicate with an input/output controller 11 which prepares the data for transfer to a modem 12, shown as an example of a signal conditioning circuit for transmitting signals to and receiving signals from a communications link over which the data signals pass serially. Although shown as a separate device, the input/output controller 11 may be included in the CPU 10 or equivalent device.

The modem 12 performs several functions. It receives data in serial fashion from the controller 11 and in response to the digital data modulates a carrier by any one of many known modulation schemes for transmission onto a communications link 13.

The communications link 13 may comprise a telephone circuit, microwave circuit, or other type of link. When data is to be transferred from the link 13 to the central location, the modem 12 demodulates the incoming data and converts it into digital data in serial form for transfer to the controller 11.

The communications link 13 thus connects the central location and one or more remote locations, the device at one remote location being shown in FIG. 1. The remote location contains a modem 14 which demodulates signals from the communications link 13 for transfer to a remote device 15 as serial digital data. The modem 14 also converts digital data from the remote device 15 to a modulated carrier for transmission onto the communications link 13.

In actual construction, the CPU 10, the controller 11 and the modem 12 comprise circuit elements mounted on printed circuit boards. Usually the circuits are grouped by function; often a single printed circuit board contains all the elements in a modem. Connector blocks, which in combination constitute "backplane," support the boards, usually at assigned positions. Alternatively, the modem may comprise a separately housed unit with a cable connected into a connector block.

Figure 2:
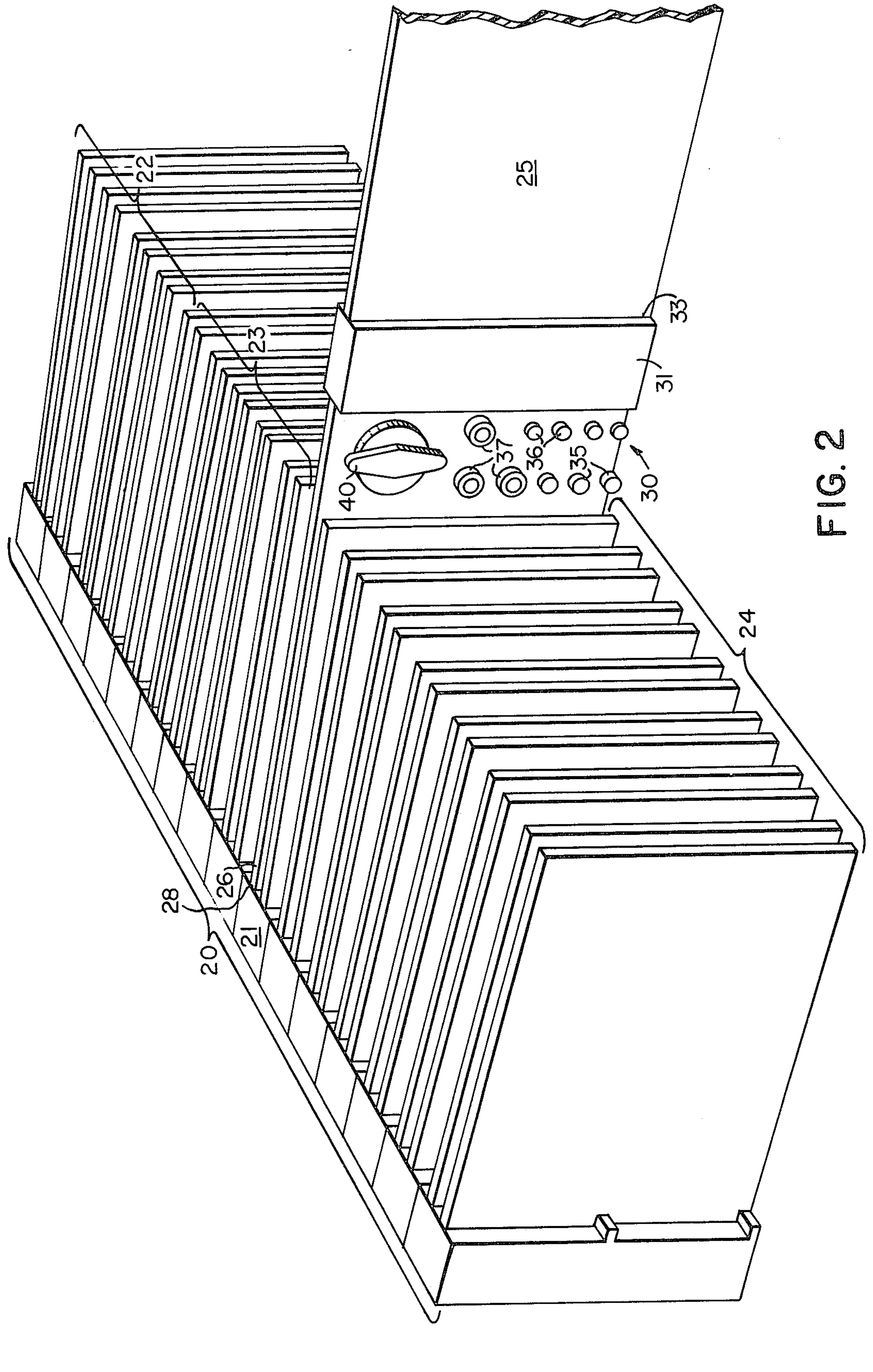
FIG. 2 shows a typical physical arrangement of circuit boards in which an extender board constructed in accordance with this invention is in use.

Referring to FIG. 2, a plurality of connector blocks form a backplane 20. As known in the art, each of the connector blocks, such as a connector block 21, contains contact fingers or plugs. These contact fingers terminate in pins on each block (not shown) and the pins are interconnected by wires to thereby interconnect the various connector blocks and thus the printed circuit boards. FIG. 2 shows several circuit boards connected to the backplane and they can be grouped in functional sets. For example, a set 22 might function as a central processor unit; a set 23, as an input/output controller; and a set 24, in accordance with other functions.

For purposes of this discussion, a printed circuit board 25 extends to the rear of the backplane 20 and contains the modem circuitry and normally is supported in the connector block 21 like the other circuit boards. As shown in FIG. 2, however, an extender board 26 is plugged into the connector block 21, and the modem board 25, in turn, is plugged into the extender board 26.

Figure 3:
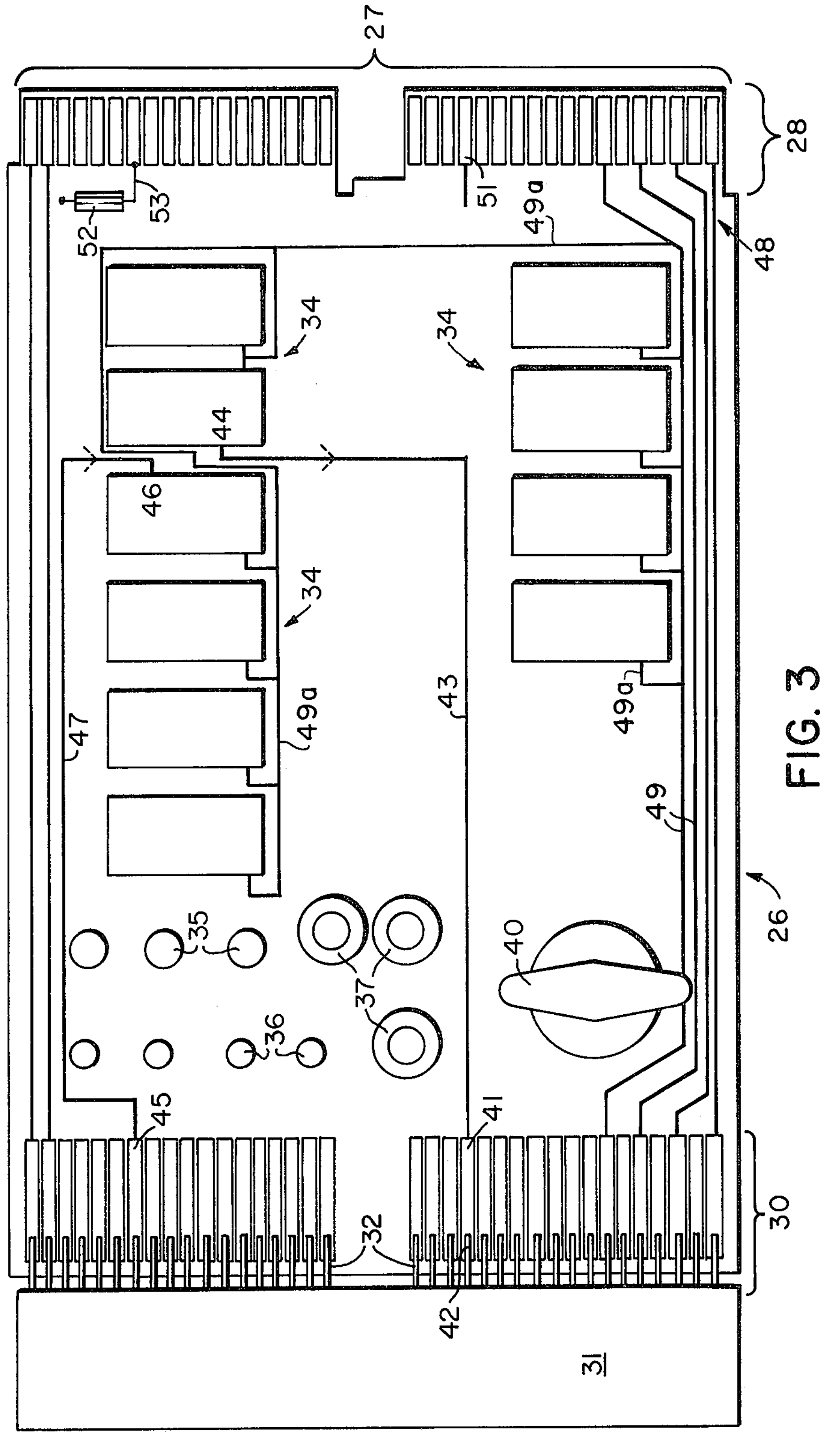
FIG. 3 is a plan pictorial diagram of an extender board such as is shown in FIG. 2.

Referring to FIGS. 2 and 3, the extender board 26 has a plurality of contacts 27 along one end 28 for insertion in the connector block 21. The other end 30 of the extender board 26 is juxtaposed to another connector block 31. Terminal pins 32 of the connector block 31 are affixed to corresponding conductors on the extender board 26 and the connector block 31 has a slot 33 including contact fingers for receiving the modem board 26.

A normal extender board contains conductor runs directly between each of the terminal pins 32 and corresponding contacts 27. When an extender board is inserted into a connector block, the contact fingers in the connector block on the extender board correspond exactly to the contact fingers in the connector block at the backplane so the extender board merely effectively displaces the backplane connector block to make the components and and test points on the circuit board accessible. As apparent from viewing FIG. 2, this positions the modem board 26 for easy access by a technician for testing purposes.

Referring to FIG. 3, extender board 26 contains various integrated circuit devices 34 and other circuit elements such as amplifiers 35, signal lights 36, push buttons 37, and a switch 40. While some of the conductors directly connect corresponding contact fingers in the connector blocks 31 with corresponding contacts at the end 28, certain conductor runs are interrupted.

For example, a contact 41 does not pass directly to a corresponding contact finger 51 at the end 28 which engages the connector block 21. A conductor 43 connects the contact 41 to the output of a circuit module 44. Similiarly another contact 45 in the block 21 is connected to an input of a circuit module 46 by a conductor 47.

A plurality of conductors generally designated by reference numeral 48 include power supply conductors 49. As shown, the circuit modules in FIG. 3 connect to these power supply conductors 49 with printed circuit connections 49*a*. Other printed circuit connections (not shown) interconnect the various modules. Thus, the board 26 does not include a separate power supply; it taps the system power supply which powers the modem board by means of connections 49*a*. These connections and method for making them are known.

Figure 4:
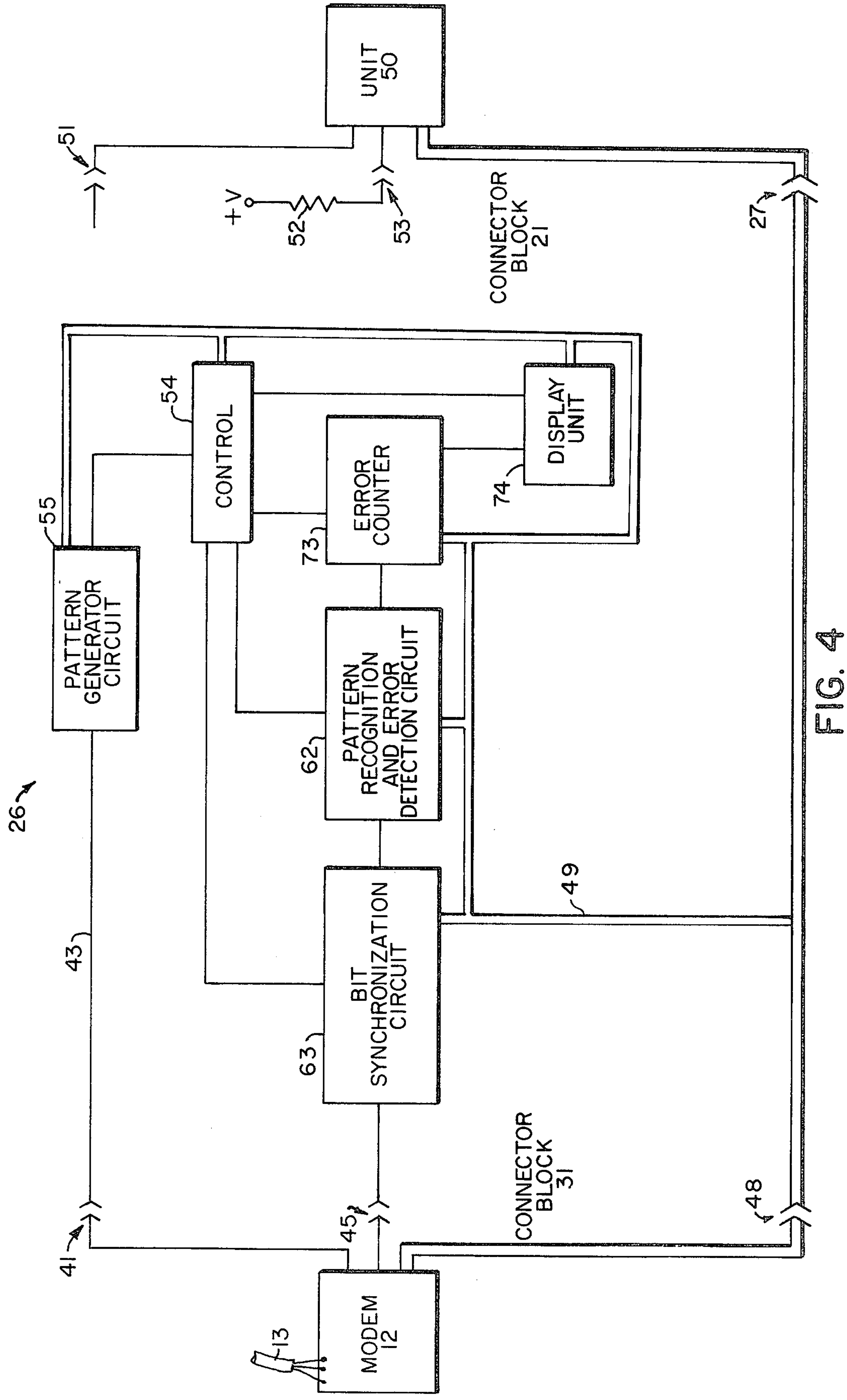
FIG. 4 is a block diagram of a testing circuit which can be installed on the extender board shown in FIG. 3.

FIG. 4 is a schematic diagram of one embodiment of the extender board 26 in which the circuit elements are arranged to provide a testing board. The connections to the connector blocks 21 and 31 are also shown. The modem 12, when inserted into the connector block 31 receives data from transmission onto the communications link 13 at the contact 41 and incoming modulated carrier signals from the link 13 are demodulated to appear in digital form at the contact 45. All the remaining conductors 48, including the power supply conductors 49 and the conductors for controlling the modem 12, pass through the rest of the contact fingers in the connector block 31 and contacts at the end 30 (FIG. 3) for transfer to the contacts 27 which are inserted into the connector block 21. A unit 50, which represents the other circuit boards in the backplane 20 also has a digital data transmitting conductor which normally provides the data to the modem for modulation. This conductor terminates as an open circuit at a contact 51 and a conductor which normally receives digital data from the modem 12 source is terminated by a resistor 52 connected to an appropriate voltage through a contact 53. Thus, all power supply voltages and control signals pass, without interruption between the modem 12 and the unit 50 over the conductors 48 with the various circuits on the extender board 26. Only the transmitted and received data signals are interrupted, with the testing circuit being substituted for transmitting and receiving fixed sets of data.

Still referring to FIG. 4 as an example of a testing circuit which can be mounted on the extender board 26 a control circuit 54 is connected to a selection means, such as the switch 40 in FIG. 3 is set to enable one testing unit to transmit data and the other unit to receive data. In the transmitting unit, the control 54 enables a pattern generator 55 to transmit a known sequence or pattern of digital data signals. This pattern of digital data signals appears on a conductor 43 and passes to the modem 12 for modulation and transmission into the link 13.

When the unit shown in FIG. 4 is to receive a pattern during a testing operation, the control 54 enables a pattern recognition and error detection circuit 62, a bit synchronization circuit 63, an error counter 73 and a display 74. Specifically, incoming signals from the link 13 are demodulated in the modem 12 and the resulting stream of data bits passes to the bit synchronization circuit 63 connected to the contact 45. The circuit 63 assures that the data is sampled at an appropriate time. The sampled bit then passes to the circuit 62. As the incoming pattern is known, any errors cause the pattern recognition and error detector circuit 62 to increment the error counter 73. At the end of a testing operation the display unit 74 then indicates the number of errors. This display unit 74 might comprise the lights 36 in FIG. 3, for example. These circuits and methods for applying circuit elements to the circuit boards are all known in the art.

As will now be apparent, the modems 12 and 14 are easily tested. Repair personnel proceed to the central and remote locations. Testing circuits on the extender boards 26 are inserted in circuit between the modems 12 and 14 and their respective devices. The testing circuit at one location is enabled to send the preselected data over the communications link 13 to be received through the other modem and the other testing unit. If the information is not decoded properly, the remotely located testing unit indicates the errors. Thereafter, the testing circuit at the remote location can be energized to pass information over the communications link 13 to the first modem for decoding and transfer to the testing circuit connected to it.

Thus, all the circuit elements are tested in accordance with this invention. With some prior systems the modem is removed from the circuit so that the communications link 13 is not simultaneously tested. Input signals including the power supply voltages at the central or remote locations are not involved in accordance with the prior art, but are with this testing circuit. More information about the overall circuit operation thereby can be obtained by using a testing circuit incorporating this invention.

As previously indicated, this circuit is also adapted to modems connected in other configurations. For example, signals being transmitted from the unit 50 might be returned to the backplane and coupled to the link through other circuits. In such a case appropriate electrical connections would be routed back through the connector blocks 31 and 21 and the card 26 from the modem. This same type of testing circuit can also be applied in the same way to test the other enumerated types of signal conditioning circuits which might be used in place of or in addition to the modem 12.

Figure 5:
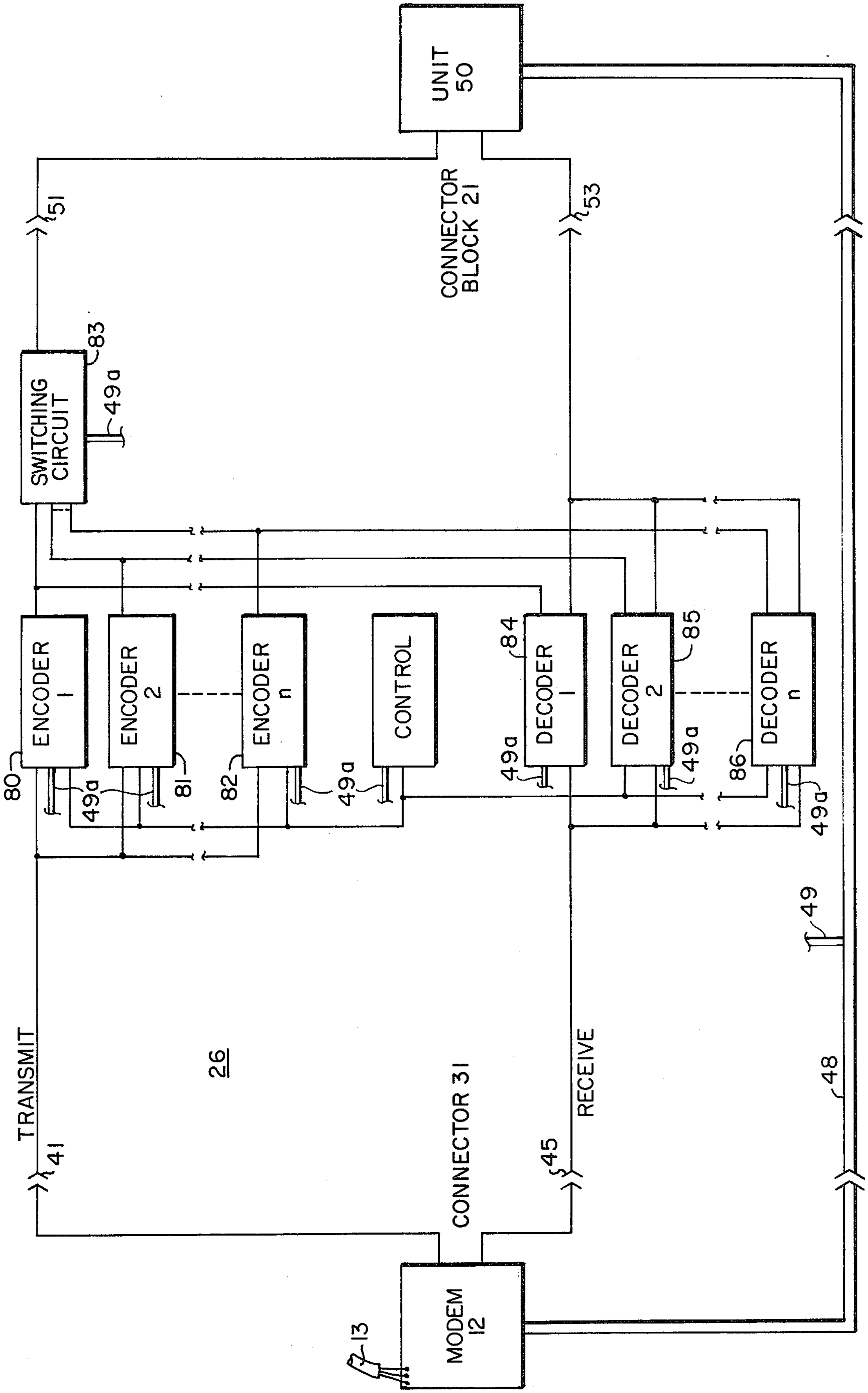
FIG. 5 is a diagram of a modification circuit which can be installed on the extender board of FIG. 3.

The extender board 26 shown in FIG. 2 is not limited merely to containing circuits for testing these signal conditioning circuits. FIG. 5 depicts a modification circuit for encoding and decoding data. Specifically at the central location the modem 12 connects through the contact 41 to receive signals from one of a plurality of encoders 80, 81 or 82, as selected by a switching circuit 83. All these circuits obtained their power by being connected to the power supply conductors 49 by means of power supply connections 49*a*. The switching circuit 83 is connected through the contact 51 to the unit 50. Thus, data for transmission is routed through the switching circuit 83 to an appropriate encoder and the encoded digital data string is passed to the modem 12. The modulated carrier is then routed to the communications link 13.

Incoming signals from the link 13 pass through the modem 12. The resulting demodulated, but encoded, signals are received on contact 45 and pass through a corresponding decoder 84, 85 or 86 for transfer through the contact 53 to the unit 50 as a decoded digital data string. All these circuits also obtain their power from the power supply conductors 49 by means of power supply connections 49*a*. A similar unit is connected between the modem 14 (FIG. 1) and the remote device 15. It is therefore merely necessary for personnel to set their respective switching circuits to assure that only encoded signals appear on the communications link. If no coding operation is necessary, the board 21 is removed.

Although FIG. 5 shows a plurality of encoders and decoders, it is also possible to have only one encoding and one decoding circuit mounted on one such board 26. Different boards with different functions could then be substituted on a scheduled basis. In fact, as the board 26 contains only those coding circuits, it may be economically feasible to throw away boards once they are used.

In accordance with this invention, we have provided a device for testing or modifying data sent over a communications link. The device is relatively inexpensive because only the functional circuit elements are located on the extender board 26. Its insertion into the block 21 automatically connects the necessary power supply and control signals. As a testing circuit, the circuitry on the extender board 26 effectively disconnects data paths in a signal conditioning unit from the normal sending and receiving units and contains the preset sending and receiving circuits to perform the necessary tests. As a modification unit the extender board 26 contains the necessary encoders and decoders. Thus, testing and data modification are greatly simplified and can be performed for a minimum expense.

It will be apparent that many different circuit arrangements can be mounted on the extender board or that a plurality of extender boards plugged together and sharing the circuitry can be used. The specifically disclosed circuitry is for purposes of explanation only. It is an intent of the appended claims to cover all such modifications as come within the true spirit and scope of this invention.

What I claim as new and desire to secure by Letters Patent of the United States:

1. In a data communications system including a communications link, a data unit with a power supply and coupling means for transmitting and receiving digital data, said data unit including a plurality of connector blocks for circuit boards and connectors, and a signal conditioning unit on one circuit board adapted for connection to one of said connector blocks to couple data to and from the communications link, the signal conditioning unit including coupling means for receiving data and power from the data unit through the one connector block and for transmitting data to the data unit through the one connector block, the improvement comprising:

A. an extender circuit board,

B. first means on said extender circuit board for engaging the one connector block to thereby support said extender circuit board in electrical connection to the data unit, C. second means on said extender circuit board for engaging the one circuit board to thereby support the one circuit board and effect an electrical connection therewith, D. a plurality of conductors formed on said extender circuit board including power supply and data conductors, said power supply conductors being connected to said first and second engaging means to thereby supply power to the signal conditioning unit, and E. circuit means mounted on said extender circuit board including power supply and data connections, said data connections being connected to said data conductors so said circuit means is connected in circuit with the data unit and signal conditioning unit for receiving and transmitting digital data to and from the coupling means in the data unit and signal conditioning unit and said power supply connections being connected to said power supply conductors whereby the signal conditioning unit receives power from the data unit.

2. In a system as recited in claim 1 wherein said circuit means is adapted for testing said signal conditioning unit, said circuit means comprising:

i. means for generating signals representing a known digital data sequence, ii. means coupling the digital data sequence signals to said second engaging means, iii. means for comparing signals representing the known data sequence and incoming signals from the signal conditioning unit, iv. means for coupling received signals from the signal conditioning unit to said second engagingg means, and v. means connected to said comparing means for indicating errors.

3. In a system as recited in claim 1 wherein said circuit means is adapted to encode and decode digital data, said circuit means including:

i. encoding means for encoding digital data from the data unit, ii. means for coupling said encoding means to the signal conditioning unit, iii. decoding means responsive to signals from the signal conditioning unit providing digital data to the data unit, and iv. means for coupling said decoding means to the data signal conditioning unit.

4. In a system as recited in claim 1 wherein the signal conditioning unit includes control conductors for connection to corresponding positions in the connector blocks and said circuit board includes additional conductors for coupling corresponding positions on said first and second engaging means to transmit control signals to the signal conditioning unit over the control conductors from the one connector block.

* * * * *